United States Patent
Itoh et al.

(10) Patent No.: US 6,617,272 B2
(45) Date of Patent: Sep. 9, 2003

(54) $Si_3N_4$ SINTERED BODY WITH HIGH THERMAL CONDUCTIVITY AND METHOD FOR PRODUCING THE SAME

(75) Inventors: Ai Itoh, Itami (JP); Michimasa Miyanaga, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/819,986

(22) Filed: Mar. 29, 2001

(65) Prior Publication Data

US 2001/0027158 A1 Oct. 4, 2001

Related U.S. Application Data

(63) Continuation-in-part of application No. 09/261,155, filed on Mar. 3, 1999, now abandoned.

(30) Foreign Application Priority Data

Mar. 5, 1998 (JP) .............................................. 10-53281
Feb. 9, 1999 (JP) .............................................. 11-31009

(51) Int. Cl.[7] ............................................ C04B 35/594
(52) U.S. Cl. ...................................................... 501/97.2
(58) Field of Search ............................. 501/97.1, 97.2

(56) References Cited

U.S. PATENT DOCUMENTS

| | | | |
|---|---|---|---|
| 5,173,458 A | 12/1992 | Nishioka et al. | |
| 5,238,884 A | 8/1993 | Sakai et al. | |
| 5,439,856 A | 8/1995 | Komatsu | |
| 5,744,410 A | 4/1998 | Komatsu et al. | |
| 5,756,411 A | 5/1998 | Nakahata et al. | |
| 5,780,374 A | 7/1998 | Kawai et al. | |
| 5,908,797 A | 6/1999 | Urashima et al. | |
| 5,945,363 A | 8/1999 | Aihara et al. | |
| 6,297,184 B1 * | 10/2001 | Fukudome et al. | 501/97.2 |
| 6,410,468 B2 * | 6/2002 | Nakahata et al. | 501/97.1 |

FOREIGN PATENT DOCUMENTS

| | | |
|---|---|---|
| EP | 0 438 897 | 7/1991 |
| EP | 0 648 717 | 4/1995 |
| JP | 7-109176 | 4/1995 |
| JP | 9-30866 | 2/1997 |
| JP | 9-268069 | 10/1997 |

* cited by examiner

Primary Examiner—Karl Group
(74) Attorney, Agent, or Firm—McDermott, Will & Emery

(57) ABSTRACT

An $Si_3N_4$ sintered body produced by reactive sintering of silicon, wherein a compound of at least one element selected from the group consisting of Y, Yb and Sm is contained by 0.6 to 13% by weight as $Ln_2O_3$ (wherein Ln=Y, Yb or Sm), an oxygen content in $Si_3N_4$ crystal grains is not more than 1% by weight, a ratio of Si and Ln in the $Si_3N_4$ sintered body is within a range of 0.1 to 0.8 in a molar ratio of $SiO_2/Ln_2O_3$ of the Si in terms of $SiO_2$ to the oxide $Ln_2O_3$, and the sintered body has a relative density of 85 to 99.9%, a thermal conductivity of at least 70 W/m.K or more and a three-point bending strength of at least 600 MPa. The $Si_3N_4$ sintered body is produced by mixing 80 to 99% by weight of silicon powder and 1 to 20% by weight of powder of oxide of at least one element of Y, Yb and SM, by nitriding a molded body of the powder mixture in an atmosphere containing nitrogen at 1400° C. or less, and then sintering the nitrided body in an atmosphere containing nitrogen at a temperature of 1700 to 1950° C. In the production, a coupling agent including C, H, O and metal cations (e.g., Si or Ti) can be used as a reducing coating agent to further improve the thermal conductivity.

6 Claims, No Drawings

SI₃N₄ SINTERED BODY WITH HIGH THERMAL CONDUCTIVITY AND METHOD FOR PRODUCING THE SAME

RELATED APPLICATIONS

This application claims priority from and is a continuation-in-part application of U.S. patent application Ser. No. 09/261,155, filed Mar. 3, 1999, now abandoned which is incorporated herein by reference.

BACKGROUND OF THE INVENTION

1. Field of the Invention

This invention relates to an $Si_3N_4$ sintered body having a high thermal conductivity as well as an excellent mechanical strength and further to a method for producing the same.

2. Description of the Prior Art

Heretofore, since an $Si_3N_4$ sintered body comprising $Si_3N_4$ as a main component has an excellent high-temperature property, the body has been used as materials for structural parts and mechanical parts used under high temperature condition. However, although a silicon nitride sintered body obtained by a prior producing method is excellent in mechanical strength such as toughness, it has been difficult to apply it to parts or members in which a high thermal-shock resistance is required because of being inferior in thermal conductivity as compared with aluminum nitride (AlN), silicon carbide (SiC), or beryllium oxide (BeO).

The reason why the thermal conductivity of the $Si_3N_4$ sintered body is low is that phonons as a carrier for thermal conduction are scattered by impurities such as oxygen ions which dissolve into the crystal of $Si_3N_4$ and form a solid solution. In $Si_3N_4$ powder which has heretofore been used as a raw material for an $Si_3N_4$ sintered body, since oxygen dissolves in the state of solid solution during the producing process, usually, oxygen of approximately 1.5% is contained. Oxygen existing in $Si_3N_4$ powder and oxygen in a naturally-formed oxide film composed mainly of $SiO_2$ being produced at the powder surface are diffused and dissolve into the crystals of $Si_3N_4$ to form a solid solution in the sintering process, thereby causing phonon scattering.

In one of the methods for producing an $Si_3N_4$ sintered body, there is a reactive sintering-method using silicon powder as a raw material powder and nitriding this silicon powder. However, also in the reactive sintering-method, oxygen in the naturally-formed oxide film existing on particle surfaces of the silicon powder dissolves into the silicon particles and $Si_3N_4$ particles formed during nitriding process of silicon and forms a solid solution. Further, oxygen dissolves into the $Si_3N_4$ particles also in a subsequent sintering process and forms a solid solution. Such a solid solution unavoidably reduces the thermal conductivity of the resultant $Si_3N_4$ sintered body.

Therefore, a method for producing an $Si_3N_4$ sintered body having a high thermal conductivity has been studied. For example, in Japanese Patent Laid-Open No. 9-268069, a method has been proposed in which $Si_3N_4$ powder is used as a raw material and oxides of 3A group elements in the periodic table are added while the amount of oxygen and the amount of aluminum are controlled. In this method, the material is fired at a temperature of 1500 to 1800° C., and further fired at a temperature of 2000° C. or higher in nitrogen of 1.5 atm or higher for 5 to 10 hours. The resultant sintered body is further heat-treated in an non-oxidizing atmosphere at a temperature of 1000 to 1400° C. Although it is said that this method provides an $Si_3N_4$ sintered body having a thermal conductivity at least 70 W/m.K, it can not be considered to be a method suitable for the mass production from the viewpoint of the energy cost because high temperature and high pressure are required in this method.

On the other hand, when an $Si_3N_4$ sintered body is prepared using the silicon powder as a raw material, by the reactive sintering method, nitriding and sintering reactions do not progress sufficiently when using only Si powder. For this reason, in order to achieve a highly densified and strengthened product by nitriding and sintering, in general, rare earth oxide or alkaline earth oxide are added. For example, Japanese Patent Laid-Open No. 7-109176 describes a method for producing an $Si_3N_4$ sintered body by reactive sintering at the temperature range of 1400 to 1850° C. applicable in mass production in which silicon powder and a sintering aid consisting of $Y_2O_3$ powder and $Al_2O_3$ powder are used as raw materials. However, the thermal conductivity of the $Si_3N_4$ sintered body produced by this method is only approximately 40 W/m.K, which is not the value to be satisfied.

As described above, in order to obtain an $Si_3N_4$ sintered body having a high thermal conductivity, there has been proposed a method for achieving a high thermal conductivity and a high strength by sintering $Si_3N_4$ powder at a high temperature under a high pressure, but since the producing cost is increased due to an increase in the energy cost or the like, the method has not been practical. Moreover, even in the case where an $Si_3N_4$ sintered body is produced at a low price by a reactive sintering method, there is a difficulty in obtaining a high thermal conductivity although the $Si_3N_4$ sintered body obtained is excellent in mechanical strength.

SUMMARY OF THE INVENTION

In view of such previous circumstances, an object of the invention is to provide an $Si_3N_4$ sintered body having a high thermal conductivity together with a high strength property inherent in an $Si_3N_4$ sintered body, at a low cost, by a reactive sintering method.

In order to achieve the above-mentioned object, the invention provides a $Si_3n_4$ sintered body. In accordance with the present invention, a $Si_3N_4$ sintered body is produced by reactive sintering of silicon, the $Si_3N_4$ sintered body comprising crystal grains of $Si_3N_4$ and a grain boundary phase, wherein a compound of at least one element selected from the group consisting of Y, Yb and Sm is contained in an amount of 0.6 to 13% by weight in terms of oxide $Ln_2O_3$ thereof, an oxygen content in the crystal grains of $Si_3N_4$ is not more than 1% by weight, a ratio of oxygen and Ln in the $Si_3N_4$ sintered body is within a range of 0.1 to 0.8 in a molar ratio $SiO_2/Ln_2O_3$ of the oxygen in terms of $SiO_2$ to the oxide $Ln_2O_3$, the $Si_3N_4$ sintered body comprising a relative density in the range of 85 to 99.9%, a thermal conductivity of at least 70 W/m.K or more, and a three point bending strength of at least 600 Mpa.

Furthermore, the $Si_3N_4$ crystal grains are β-type ones having an average grain size of not less than 2 μm in terms of major axis, and in the grain boundary phase, preferably a compound $ln_aSi_bO_cN_d$ (wherein $2 \leq a \leq 4$, $2 \leq b \leq 3$, $0 \leq c \leq 7$, $2 \leq d \leq 4$), more preferably a compound $Yb_4Si_2O_7N_2$ is contained.

A method for producing the $Si_3N_4$ sintered body according to the invention comprises:

mixing 80 to 99% by weight of a silicon powder having an oxygen content not more than 1% by weight and 1 to 20% by weight of a powdered oxide $Ln_2O_3$ (where Ln=Y, Yb or Sm) of at least one element selected from the group consisting of Y, Yb and Sm, thereby providing a powdered raw material;

molding the raw material into a molded body;

nitriding the molded body in an atmosphere containing nitrogen at a temperature of not higher than 1400° C.; and sintering the nitride body obtained in an atmosphere containing nitrogen at a temperature of 1700 to 1950° C.

In this method for producing the $Si_3N_4$ sintered body, a reducing coating agent in an amount of 1 to 10% by weight based on the weight of the silicon powder is further added to and mixed with the above-described powdered raw material, and a molded body of the resultant mixture is head-treated with in a vacuum of not more than 100 Torr or in an atmosphere containing nitrogen at a temperature of 200 to 800° C., and then the above-described nitriding and sintering can be performed. As the reducing coating agent of this case, a compound including C, H, O and metallic cations can be used, and specifically, a coupling agent including Si or Ti as the metallic cations is preferable.

Moreover, in the method for producing the $Si_3N_4$ sintered body, the content of oxygen, Y, Yb and Sm in the powdered raw material is preferably within the range of 0.1 to 2 in terms of a molar ratio of oxides, $SiO_2/Ln_2O_3$, and more preferably the range is within 0.1 to 0.8.

DETAILED DESCRIPTION OF THE PREFERRED EMBODIMENTS

It is thought that lattice defects in the $Si_3N_4$ crystal grains and a glass component in the grain boundary phase exert influences upon the thermal conductivity of the $Si_3N_4$ sintered body, and as the lattice defects, an existence of impurity ions such as oxygen ions which dissolve into the crystals in the state of solid solution is enumerated. Therefore, in the invention, formation of a solid solution due to the dissolution of impurity oxygen ions into the crystal grains of $Si_3N_4$ is suppressed by using the silicon powder having an oxygen content of not more than 1% by weight as a starting material so that the thermal conductivity of the $Si_3N_4$ sintered body is enhanced.

Moreover, a kind of an oxide system sintering aid which is one component of the starting material also exerts an influence upon the thermal conductivity of the $Si_3N_4$ sintered body. Namely, it has been known that since oxides of 3A group elements in the periodic table do not dissolve into the crystals of $Si_3N_4$ to form a solid solution, it is advantageous from the viewpoint of thermal conductivity. In the invention, as a result of the intensive studies on the sintering aid of the 3A group elements, it was discovered that among the 3A group elements, Y, Yb and Sm are effective for enhancing thermal conductivity and especially Yb is most effective, whereby the oxides of these elements are used as a sintering aid.

Since Y, Yb and Sm have a high strength of an ion electric field and composite oxides are formed through a strong electrostatic bonding with oxygen ions in the grain boundary phase, even at high temperature, Y, Yb and Sm act so as to prevent oxygen from dissolving into the crystal grains of $Si_3N_4$ to form a solid solution. Moreover, when these elements are added, a crystal phase which is precipitated in the grain boundary phase has a better crystallinity than one in the case where the other 3A group elements are added. By the above reason, it is thought that addition of Y, Yb and Sm provides highly enhanced thermal conductivity to the resultant $Si_3N_4$ sintered body.

The amount of addition of the oxide ($Ln_2O_3$) powder of the above-described Y, Yb and Sm (collectively expressed by Ln, hereinafter referred to as the same way) is within the range of 1 to 20% by weight based on the total of the raw material powders including the silicon powder. When this amount of addition is less than 1% by weight, nitriding reaction of silicon powder is not stimulated sufficiently and the silicon particles remain after nitriding. Therefore, an elution reaction of silicon particles occurs at a higher temperature than the melting point of silicon at subsequent sintering, whereby a sintered body of 85% or more in relative density can not be obtained, so that the sintered body fails to have a thermal conductivity of 70 W/m.K or more and a three-point bending strength of 600 MPa or higher. In contrast to this, when this amount of addition exceeds 20% by weight, the amount of the grain boundary phase in the resultant sintered body obtained is increased, whereby the thermal conductivity of the sintered body is reduced.

Moreover, the ratio of oxygen and Ln in the $Si_3N_4$ sintered body is within the range of 0.1 to 0.8 in a molar ratio $SiO_2/Ln_2O_3$ of $SiO_2$ to the oxide $Ln_2O_3$ and as described in the later examples, the contents of oxygen and Ln in the sintered body accord with those in the raw material powders. In the molar ratio the amount of $SiO_2$ is the amount when all oxygen in the sintered body is assumed to be present as $SiO_2$. Namely, the amount of $SiO_2$ is calculated as the product of x% by weight and a molecular ratio of $SiO_2/O_2$, when the amount of oxygen in the silicon powder is x% by weight. In the above ratio, the amount of $Ln_2O_3$ is the total amount of $Y_2O_3$, $Yb_2O_3$ and $Sm_2O_3$ powders initially added as a sintering aid. When the molar ratio of $SiO_2/Ln_2O_3$ is less than 0.1, the liquid phase is not generated sufficiently at the time of sintering, whereby sintering can not be progressed, so that the strength of the resultant sintered body can not be improved sufficiently. On the other hand, when the molar ratio of $SiO_2/Ln_2O_3$ exceeds 2, the amount of the liquid phase increases and the dissolution amount of $Si_3N_4$ into the liquid phase is also increased, so that the proportion of the grain boundary phase becomes large. Therefore, there is the danger that the thermal conductivity of the sintered body will be reduced.

After molding the powdered raw material prepared in such manner, the molded body is sintered at a temperature of not higher than 1400° C. in an atmosphere containing nitrogen to nitride the silicon powder. For a gas pressure of the atmosphere containing nitrogen in this case, an approximately normal pressure (1 atm) is preferable. When the firing temperature at nitriding exceeds 1400° C., the temperature reaches the melting point of silicon and the elution reaction of Si occurs before the nitriding reaction of silicon is finished, so that it results in that not-yet nitrided portion of silicon remains, and this silicon will lead to an reduction in thermal conductivity and strength. Therefore, the firing temperature exceeding 1400° C. is not preferable. The lower limit of the preferable firing temperature for nitriding is 1200° C.

The molded body (referred to as the nitrided body) nitrided in the above-described manner is fired at a temperature of 1700 to 1950° C. in an atmosphere containing nitrogen to form a dense $Si_3N_4$ sintered body. When the firing temperature of this treatment is lower than 1700° C., the liquid phase is not generated sufficiently and the sintering reaction does not proceed, whereby the grains do not grow and the thermal conductivity and the mechanical strength of the resultant sintered body become low. When the firing temperature exceeds 1950° C., the growth of $Si_3N_4$ grains becomes considerable. Accordingly, although the thermal conductivity of the resultant sintered body becomes high, the mechanical strength decreases, since grown coarse grains themselves act as starting points of destruction.

Thus, the $Si_3N_4$ sintered body obtained according to the method of the invention contains a compound of at least one element selected from among Y, Yb and Sm in amounts of 0.6 to 13% by weight calculated as oxide $Ln_2O_3$ and the oxygen content in the $Si_3N_4$ crystal grains is not more than 1% by weight. Moreover, the $Si_3N_4$ sintered body has a relative density of 85 to 99.9% and a thermal conductivity of 70 W/m.K or more and a three-point bending strength of 600 MPa or more. Accordingly, the $Si_3N_4$ sintered body exhibits a high thermal conductivity coupled with a high strength.

More preferably, the $Si_3N_4$ sintered body contains β-type $Si_3N_4$ crystal grains having an average grain size of 2 μm or more in terms of major axis, and especially preferably all the $Si_3N_4$ crystal grains are contained as β-type crystal grains in the $Si_3N_4$ sintered body. Throughout this specification, the grain or particle size of $Si_3N_4$ is expressed in major axis, unless otherwise specified. Since the β-type $Si_3N_4$ has a low content of impurities dissolved in the state of solid solution therein as compared with the α-type $Si_3N_4$ crystal grains and grows as β-type columnar crystal grains, the thermal conductivity of the sintered body can be further enhanced.

Moreover, in the invention, a reducing coating agent is added and mixed into the raw material powders to perform a heat-treatment for reduction, thereby being able to further improve the thermal conductivity of the $Si_3N_4$ sintered body. That is, since the reducing coating agent adheres onto the surface of the silicon powder or the like to remove the oxide films on the surface of the silicon particles at the time of the reducing heat-treatment, the oxygen content in the resultant $Si_3N_4$ sintered body further is decreased, whereby the thermal conductivity can be further improved. Such a reducing coating agent may be compounds including O, H and metal cations in addition to C as a reducing component. For example, it is preferable to use a coupling agent such as silane-type or titanate-type one including Si or Ti as metal cations which are used to improve the adhesion properties at the interfaces in composite materials.

By adding the above-described reducing coating agent to the raw material powders and by heat-treating the molded body containing this agent before firing for nitriding, oxygen in the naturally-formed oxide film on the silicon particle surface is reduced by C in the reducing coating agent and is removed. However, it is not preferable to remove all oxygen of the silicon particle surface because it makes it difficult to sinter at a low temperature. Therefore, in the method of the invention, in order to allow to remain a small quantity of oxygen, the amount of addition of this reducing coating agent is controlled within the range of 1 to 10% by weight based on the weight of the silicon powder. Moreover, the heat treatment for reducing (reducing heat-treatment) is performed within the temperature range of 200 to 800° C. in a vacuum of not more than 100 Torr or in an atmosphere containing nitrogen.

In this heat treatment for reducing, when an atmosphere containing no nitrogen is used, the heat-treatment is preferably effected in a vacuum of not more than 100 Torr. The reason is that there is the risk that when exceeding 100 Torr, oxygen in an atmosphere reacts with the reducing coating agent, so that oxygen in the silicon particle surface remain without being reduced. Moreover, the reason why the heat treatment temperature of this case is adjusted to 200 to 800° C. is that in the case of lower than 200° C., the reducing coating agent remains in the molded body to cover the surface of the silicon particles, whereby the subsequent nitriding reaction is prevented from progressing sufficiently. On the other hand, there is the risk that when the firing temperature exceeds 800° C., most of all oxygen in the molded body is reduced, so that the amount of the liquid phase at sintering becomes small, whereby the densification of the sintered body will not be effected sufficiently.

As a result of this reducing heat-treatment, a part of oxygen in the silicon particle surface remains and the remaining part is reduced and removed. Moreover, the reaction is progressed in such a manner that, in subsequent nitriding, N of nitrogen gas enters into holes formed after part of oxygen has been removed. Therefore, the grain boundary phase of the prior $Si_3N_4$ sintered body are oxides such as $Ln_pSi_qO_r$ (where p, q and r are natural numbers), whereas in the grain boundary phase of the $Si_3N_4$ sintered body prepared by the method of the invention using the reducing coating agent described above, the oxynitride expressed by $Ln_aSi_bO_cN_d$ (where $2 \leq a \leq 4, 2 \leq b \leq 3, 0 \leq c \leq 7, 2 \leq d \leq 4$) is contained. Especially, when Ln is Yb, the thermal conductivity is greatly improved, and in this case the oxynitride expressed by $Yb_4Si_2O_7N_2$ is contained in the grain boundary phase.

EXAMPLE 1

To a silicon powder (a oxygen content of 0.9% by weight, an average particle size of 0.9 μm), powder of $Y_2O_3$, $Yb_2O_3$ or $Sm_2O_3$ were added as a sintering aid in the amounts shown in Table 1 below and ball-mill mixing was performed using $Si_3N_4$ balls in an ethanol solvent in a pot made of $Si_3N_4$ for approximately 24 hours. After drying, each mixture was press-formed by a metal mold into bodies, 13 mm in diameter×4 mm in thickness, for measurements of thermal conductivity and molded bodies, 6×6×50 mm, for the bending test. Next, these molded bodies were nitrided by firing in an atmosphere containing nitrogen of 1 atm within the temperature range of 1200 to 1400° C. for 5 hour. Each nitrided body obtained was fired in an atmosphere containing nitrogen at 1 atm for 3 hours at a temperature of 1750 to 1800° C. as shown in Table 1 to obtain a sintered body.

For each $Si_3N_4$ sintered body obtained, relative density and three-point bending strength were measured and thermal diffusivity was measured by a laser-flash method as well. Further, the thermal conductivity at room temperature was calculated by a calculation formula. Moreover, by a X-ray diffraction method, it was confirmed that all the grains of $Si_3N_4$ in each sintered body were β-type. Furthermore, after a cube of approximately 3 mm in one side was cut from each sintered body, the surface was polished in a mirror surface and the microstructure was observed by a scanning electron microscope to calculate the average grain size in terms of major axis of the $Si_3N_4$ crystal grains. These results were shown together in Table 1 below.

Moreover, the contents of Y, Yb and Sm in each sintered body were measured by ICP emission analysis, and converted into the amount of oxide $Ln_2O_3$. The converted amount was the same as the initial amount of addition. On the other hand, each sintered body was measured for the oxygen content in $Si_3N_4$ grains by the inert gas fusion method. All the sintered bodies showed an oxygen content of 0.9% by weight. Assuming that all this oxygen was present as $SiO_2$, the amount of $SiO_2$ was calculated by multiplying the oxygen content described-above by the molecular ratio $SiO_2/O_2$, and the molar ratio of $SiO_2/Ln_2O_3$ was determined from both the amount of $SiO_2$ above determined and the amount of the above described $Ln_2O_3$. The results are shown in Table 1 below.

Each nitrided body prepared in the same manner as described in Example 1 was sintered in an atmosphere containing nitrogen at 1 atm for 3 hours at each temperature of 1690° C. and 1970° C. to obtain the $Si_3N_4$ sintered body. The body sintered at 1690° C. showed a lower values in relative density, three-point bending strength and thermal conductivity as compared with each sample of 1 to 4 of Example 1 described above, since sintering was not performed sufficiently due to too low sintering temperature. On the other hand, for the body sintered at 1970° C., although it exhibited a high thermal conductivity of 120 W/m.K, the three-point bending strength was below 600 MPa since coarse $Si_3N_4$ crystal grains excessively grown acted as starting points of destruction.

COMPARATIVE EXAMPLE 1

In the same manner as Example 1 except using a silicon powder having a oxygen content of 1.5% by weight and an average particle size of 0.7 μm, an $Si_3N_4$ sintered body was prepared as comparative sample 1. Moreover, in the same manner as Example 1 except using $Nd_2O_3$ powder or $La_2O_3$

TABLE 1

| Sample | Sintering aid Kind | (wt. %) | Molar ratio of $SiO_2/Ln_2O_3$ | Sintering temperature (° C.) | Density (%) | Major axis (μm) | Thermal conductivity (W/m.K) | Strength (MPa) |
|---|---|---|---|---|---|---|---|---|
| 1 | $Y_2O_3$ | (8) | 0.73 | 1750 | 95 | 7 | 80 | 800 |
| 2 | $Yb_2O_3$ | (20) | 0.44 | 1800 | 94 | 15 | 90 | 700 |
| 3 | $Sm_2O_3$ | (15) | 0.56 | 1750 | 95 | 8 | 88 | 880 |
| 4 | $Y_2O_3 \cdot Yb_2O_3$ | (17) | 0.43 | 1800 | 95 | 10 | 88 | 780 |

In addition, separately from the above samples, molded bodies were prepared in the same manner as set forth in Example 1 and subjected to a nitriding treatment in the same manner as described above except that bodies were nitrided within the peak temperature ranging from higher than 1400° powder as a sintering aid, further $Si_3N_4$ sintered bodies were prepared as comparative samples 2 and 3. The $Si_3N_4$ sintered bodies thus obtained were evaluated in the same manner as Example 1 and the results were shown in Table 2 below.

TABLE 2

| Comparative Sample | Sintering aid Kind | (wt. %) | Molar ratio of $SiO_2/Ln_2O_3$ | Sintering temperature (° C.) | Density (%) | Major axis (μm) | Thermal conductivity (W/m.K) | Strength (MPa) |
|---|---|---|---|---|---|---|---|---|
| 1 | $Y_2O_3$ | (8) | 1.22 | 1750 | 96 | 8 | 63 | 800 |
| 2 | $Nd_2O_3$ | (15) | 0.89 | 1800 | 94 | 5 | 60 | 611 |
| 3 | $La_2O_3$ | (15) | 0.87 | 1750 | 94 | 3 | 55 | 590 |

C. to 1430° C. Thereafter, sintering was performed under the same condition as in Example 1. The thus obtained $Si_3N_4$ sintered bodies showed a low relativity density since silicon eluted in the step of nitriding remained without being nitrided. Further, the three-point bending strength of each sintered body greatly lowered as compared with each sample of 1 to 4 of Example 1 described above since clusters of eluted silicon remaining in the not-yet-nitrided condition acted as starting points of destruction.

It is thought the reason why the thermal conductivity of the $Si_3N_4$ sintered body of comparative sample 1 was lower than that of sample 1 of Example 1 is that since the oxygen content exceeded 1% by weight in the silicon powder used as a raw material, oxygen as an impurity dissolved into the crystals of $Si_3N_4$ in the state of a solid solution, so that phonons acting as a carrier for thermal conduction were scattered. Moreover, as a result of the X-ray diffraction analysis, the $Si_3N_4$ sintered bodies of comparative samples 2 and 3 showed that part of the $Si_3N_4$ grains were not transformed into β-type grains, and α-type $Si_3N_4$ grains were still present. It is thought the reason for this is that in the case of using $La_2O_3$ or $Nd_2O_3$ as a sintering aid, a phase transformation rate from α-type to β-type is slower as compared with each sintering aid of $Y_2O_3$, $Yb_2O_3$ and $Sm_2O_3$. Therefore, in the $Si_3N_4$ sintered bodies of comparative samples 2 and 3 exhibited a very low thermal conductivity.

COMPARATIVE EXAMPLE 2

As comparative sample 4 to 9, $Si_3N_4$ sintered bodies were prepared in the same manner as described in Example 1 using the silicon powder used in Example 1, except that the amount of addition of each powder of $Y_2O_3$, $Yb_2O_3$ and $Sm_2O_3$ as a sintering aid was varied as shown in Table 3. Each $Si_3N_4$ sintered body thus obtained was evaluated in the same manner as Example 1 and the results were shown in Table 3.

TABLE 3

| Comparative Sample | Sintering aid Kind | (wt. %) | Molar ratio of $SiO_2/Ln_2O_3$ | Sintering temperature (° C.) | Density (%) | Major axis (μm) | Thermal conductivity (W/m.K) | Strength (MPa) |
|---|---|---|---|---|---|---|---|---|
| 4 | $Y_2O_3$ | (0.8) | 13.13 | 1750 | 75 | 1 | 58 | 350 |
| 5 | $Y_2O_3$ | (22) | 0.38 | 1750 | 95 | 8 | 69 | 750 |
| 6 | $Yb_2O_3$ | (0.8) | 22.90 | 1800 | 80 | 5 | 60 | 550 |
| 7 | $Yb_2O_3$ | (25) | 0.55 | 1800 | 99 | 15 | 67 | 780 |
| 8 | $Sm_2O_3$ | (0.8) | 20.27 | 1750 | 84 | 3 | 40 | 500 |
| 9 | $Sm_2O_3$ | (25) | 0.49 | 1750 | 97 | 8 | 60 | 780 |

As understood from the foregoing results, when the amount of addition of the sintering aid was less than 1% by weight, the nitriding reaction of silicon did not sufficiently progress, so that in the not-yet-nitrided silicon remained in the sintered body, whereby the relative density, the thermal conductivity and the three-point bending strength of the sintered body were lower than those of each sample of Example 1. When the sintering aid was excessively added in an amount of more than 20% by weight, the sinterability was improved and the relative density was increased. However, since the proportion occupied by the grain boundary phase became large, the thermal conductivity lowered.

EXAMPLE 2

To the same silicon powder as used in Example 1, 8% by weight of $Y_2O_3$ powder was added as a sintering aid in the same manner as described for sample 1. The molar ratio of $SiO_2/Ln_2O_3$ was 0.73 in all the samples. In addition, as a reducing coating agent, a silane coupling agent, vinyl triethoxysilane ($CH_2$=$CHSi(OC_2H_5)_3$), was added in such a manner that the proportion of addition to the silicon powder was varied as shown in Table 4, and ball-mill mixing was performed under the same conditions as described in Examples 1.

Each powdered mixture was molded in the same manner as in Example 1 and the molded body was subjected to a reducing heat-treatment at 500° C. in an atmosphere containing nitrogen at 1 atm for 2 hours, and then, in the same manner as in Example 1, nitriding and subsequent sintering were performed to prepare a $Si_3N_4$ sintered body as each of samples 1-1 to sample 1-3. Each sintered body obtained was evaluated in the same manner as in Example 1. The results are shown together with the kinds of the oxynitrides which were detected by the X-ray diffraction analysis to be included in the grain boundary phase, in Table 4 below. Moreover, the molar ratio of $SiO_2/Ln_2O_3$ was 0.73 in all the samples when calculated in the same manner as in Example 1 wherein the amount, calculated as $Y_2O_3$, of the sintering aid in the sintered body was 8% by weight, and the amount of oxygen in $Si_3N_4$ grains was 0.9% by weight. The molar ratio of $SiO_2/Ln_2O_3$ is also shown in Table 4 below.

TABLE 4

| Sample | Amount of coating agent (wt. %) | Molar ratio of $SiO_2/Y_2O_3$ | Sintering temperature (° C.) | Density (%) | Major axis (μm) | Oxynitride in grain boundary phase | Thermal conductivity (W/m.K) | Strength (MPa) |
|---|---|---|---|---|---|---|---|---|
| 1-1 | 1 | 0.73 | 1800 | 93 | 6 | $Y_4Si_2O_7N_2$ | 83 | 750 |
| 1-2 | 5 | 0.73 | 1800 | 90 | 7 | $Y_4Si_2O_7N_2$ | 88 | 700 |
| 1-3 | 10 | 0.73 | 1950 | 87 | 6 | $Y_4Si_2O_7N_2$ | 90 | 690 |

Moreover, by using the same reducing coating agent as described above and by adding the same $Yb_2O_3$ powder as in sample 2 of Example 1 in the same amount as described in place of the $Y_2O_3$ powder as a sintering aid, $Si_3N_4$ sintered bodies were prepared as set forth above. The resultant sintered bodies were designated as sample 2-1 to sample 2-3. Similarly, by adding the same $Sm_2O_3$ powder as in sample 3 of Example 1 in the same amount as described, $Si_3N_4$ sintered bodies were prepared in the same manner as described above. These samples were designated as sample 3-1 to sample 3-3. Each $Si_3N_4$ sintered body thus obtained was evaluated in the same manner as described above. The results are shown in Table 5. Moreover, the molar ratio of $SiO_2/Ln_2O_3$ was calculated in the same manner as Example 1, wherein the amount, in terms of $Yb_2O_3$, of the sintering aid in the sintered body of was 20% by weight, and the amount as $Sm_2O_3$ was 15% by weight, the oxygen content in $Si_3N_4$ grains was 0.9% by weight. These molar ratios of $SiO_2/Ln_2O_3$ are shown in Table 5 below.

TABLE 5

| Sample | Amount of coating agent (wt. %) | Molar ratio of $SiO_2/Ln_2O_3$ | Sintering temperature (° C.) | Density (%) | Major axis (μm) | Oxynitride in grain boundary phase | Thermal conductivity (W/m.K) | Strength (MPa) |
|---|---|---|---|---|---|---|---|---|
| 2-1 | 1 | 0.44 | 1850 | 94 | 15 | $Yb_4Si_2O_7N_2$ | 95 | 695 |
| 2-2 | 5 | 0.44 | 1900 | 90 | 14 | $Yb_4Si_2O_7N_2$ | 100 | 690 |
| 2-3 | 10 | 0.44 | 1950 | 88 | 11 | $Yb_4Si_2O_7N_2$ | 102 | 685 |
| 3-1 | 1 | 0.56 | 1800 | 93 | 9 | $Sm_2Si_3O_3N_4$ | 90 | 750 |
| 3-2 | 5 | 0.56 | 1900 | 95 | 9 | $Sm_2Si_3O_3N_4$ | 93 | 780 |
| 3-3 | 10 | 0.56 | 1950 | 90 | 6 | $Sm_2Si_3O_3N_4$ | 95 | 700 |

Moreover, an $Si_3N_4$ sintered body was prepared under the same conditions as sample 1-1 except that a molded body prepared in the same manner as sample 1-1 of Example 1 described above was subjected to a reducing heat-treatment at each temperature of 190° C., 250° C., 780° C. and 820° C. in an atmosphere containing nitrogen. In the case of the $Si_3N_4$ sintered body obtained at the reducing heat-treatment temperature of 190° C., the nitriding reaction did not progress due to the influence of the residual coating agent, whereby the not-yet-nitrided silicon remained in the resultant sintered body, so that the mechanical strength was reduced. In the $Si_3N_4$ sintered body obtained at the reducing heat-treatment temperature of 820° C., since the amount of oxygen in the molded body became small and sintering did not be successfully effected. Therefore, the $Si_3N_4$ sintered body obtained had a low relative density of 80%, so that the three-point bending strength also reduced to 550 MPa. On the other hand, the $Si_3N_4$ sintered bodies obtained at the reducing heat-treatment temperatures of 250° C. and 780° C. showed a good sinterability, i.e., a relative density of 85% or more. Further, in these samples, oxygen in the molded bodies was removed partially by the coating agent, so that the sintered bodies had excellent properties with regard to thermal conductivity and three-point bending strength, which were equivalent to or superior to those of sample 1-1.

Furthermore, $Si_3N_4$ sintered bodies were prepared under the same conditions as in sample 1-1, except that molded bodies prepared in the same manner as in sample 1-1 of Example 1 described above were subjected to reducing heat-treatments in a vacuum of 90 Torr and 110 Torr, respectively. As a result, in the sintered body obtained by the reducing heat-treatment in the vacuum of 90 Torr, a reduction reaction between oxygen in the molded body and the coating agent progressed without any trouble and oxygen being the impurity which deteriorated the thermal conductivity of the sintered body was removed partially. Accordingly, the resultant sintered body had a thermal conductivity well comparable with or superior to that of sample 1-1. However, in the sintered body obtained by the reducing heat-treatment in the vacuum of 110 Torr, due to the reaction between oxygen contained in the atmosphere and the coating agent, oxygen in the sintered body could not been removed, whereby the thermal conductivity of the sintered body could not be improved.

EXAMPLE 3

To the same silicon powder as used in Example 1 described above, 8% by weight of an $Y_2O_3$ powder was added to give a molar ratio of $SiO_2/Ln_2O_3$ of 0.73 in the same manner as in sample 1. In addition, as a reducing coating agent to be add to the powdered raw material, isopropyltrioctanoyl titanate $((CH_3)_2CH-O-Ti-(OCOC_7H_{15})_3)$ being a titanate coupling agent was added in such amounts that the proportions to the silicon powder became as shown in Table 6, and then mixed by a ball mill under the same conditions as in Examples 1.

Each of these powder mixtures was molded in the same manner as in Example 1 and, a reducing heat-treatment was conducted on each molded body in an atmosphere containing nitrogen at 500° C. under 1 atm for 2 hours, and subsequently, in the same manner as in Example 1, nitriding and subsequent sintering were performed to prepare each $Si_3N_4$ sintered body as sample 1-4 to sample 1-6. Each $Si_3N_4$ sintered body obtained was evaluated in the same manner as in Example 1. The results are shown together with the kinds of the oxynitrides included in the grain boundary phase, in Table 6 described below. Moreover, the amount as $Y_2O_3$ and the amount of oxygen in each sintered body were the same as those of Example 1 and the molar ratio of $SiO_2/Ln_2O_3$ was also 0.73 being the same as that of Example 1.

TABLE 6

| Sample | Amount of coating agent (wt. %) | Sintering temperature (° C.) | Density (%) | Major axis (μm) | Oxynitride in grain boundary phase | Thermal conductivity (W/m.K) | Strength (MPa) |
|---|---|---|---|---|---|---|---|
| 1-4 | 1 | 1800 | 95 | 7 | $Y_4Si_2O_7N_2$ | 90 | 689 |
| 1-5 | 5 | 1900 | 90 | 7 | $Y_4Si_2O_7N_2$ | 92 | 691 |
| 1-6 | 10 | 1950 | 87 | 5 | $Y_4Si_2O_7N_2$ | 95 | 680 |

Moreover, sintered bodies as sample 2-4 to sample 2-4 and sample 3-4 to sample 3-6 were prepared as described above except that $Yb_2O_3$ powder and $Sm_2O_3$ powder were used as a sintering aid as set forth in samples 2 and 3 of Example 1 for sample 2-4 to sample 2-4 and sample 3-4 to sample 3-6, respectively, in place of the $Y_2O_3$ powder described above. Each $Si_3N_4$ sintered body obtained was evaluated in the same manner as in Example 1 and the results were shown in Table 7.

TABLE 7

| Sample | Amount of coating agent (wt. %) | Sintering temperature (° C.) | Density (%) | Major axis (μm) | Oxynitride in grain boundary phase | Thermal conductivity (W/m.K) | Strength (MPa) |
|---|---|---|---|---|---|---|---|
| 2-4 | 1 | 1800 | 93 | 15 | $Yb_4Si_2O_7N_2$ | 93 | 700 |
| 2-5 | 5 | 1900 | 90 | 14 | $Yb_4Si_2O_7N_2$ | 101 | 683 |
| 2-6 | 10 | 1950 | 86 | 11 | $Yb_4Si_2O_7N_2$ | 102 | 671 |
| 3-4 | 1 | 1800 | 95 | 9 | $Sm_2Si_3O_3N_4$ | 92 | 720 |
| 3-5 | 5 | 1900 | 92 | 9 | $Sm_2Si_3O_3N_4$ | 96 | 700 |
| 3-6 | 10 | 1950 | 88 | 6 | $Sm_2Si_3O_3N_4$ | 94 | 680 |

EXAMPLE 4

Sintered bodies of sample 1-7 to sample 1-10 were prepared in the same manner as in Example 2 described above wherein 8% by weight of $Y_2O_3$ powder was added to the silicon powder used in Example 1 as described for sample 1. In these samples, the molar ratio of $SiO_2/Ln_2O_3$ was 0.73. Further sintered bodies of sample 2-7 to sample 2-10 were prepared by adding 20% by weight of the $Yb_2O_3$ powder in the same manner as in sample 2 to give a molar ratio of $SiO_2/Ln_2O_3$ of 0.44. Still further, sintered bodies of sample 3-7 to sample 3-10 were prepared by adding 15% by weight of the $Sm_2O_3$ powder in the same manner as in sample 3 to give a molar ratio of $SiO_2/Ln_2O_3$ into 0.56.

In the above samples, vinyl triethoxysilane ($CH_2$=$CHSi(OC_2H_5)_3$) was added as a reducing coating agent in an amount of 5% by weight relative to the weight of the silicon powder in all the samples and the temperature and the atmosphere for the reducing heat-treatment were varied as shown in Table 8 below. Each $Si_3N_4$ sintered body obtained was evaluated in the same manner as in Example 1. The results were shown in Table 8 below, together with the kinds of the oxynitrides which were included in the grain boundary phase, the oxynitrides being detected by the X-ray diffraction analysis.

EXAMPLE 5

Sintered bodies of sample 1-11 were prepared in the same manner as in Example 2 described above, by adding 8% by weight of the $Y_2O_3$ powder to the same silicon powder as described in Example 1 in the same manner as in sample 1 to give a molar ratio of $SiO_2/Ln_2O_3$ of 0.73. Sintered bodies of sample 2-11 were also prepared by adding 20% by weight of the $Yb_2O_3$ powder in the same manner as in sample 2 to give a molar ratio of $SiO_2/Ln_2O_3$ of 0.44. Sintered bodies of sample 3-11 were further prepared by adding 15% by weight of the $Sm_2O_3$ powder in the same manner as in sample 3 to give a molar ratio of $SiO_2/Ln_2O_3$ of 0.56.

For all the samples, a silane coupling agent of vinyl triethoxysilane was added as a reducing coating agent in an amount of 15% by weight, which was more than 10% by weight, with respect to the weight of the silicon powder. Moreover, in for all the samples, a reducing heat-treatment was performed in an atmosphere containing nitrogen at 500° C. for 2 hours, nitriding was performed in an atmosphere containing nitrogen at 1 atm at a 1200 to 1400° C. for 5 hours, and sintering was conducted in an atmosphere containing nitrogen at 1 atm at 1900° C. for 3 hours. Each $Si_3N_4$ sintered body obtained was evaluated in the same manner as Example 1. The results are shown in Table 9.

TABLE 8

| Sample | Condition of reducing heat-treatment × Atmosphere | Sintering temperature (° C.) | Density (%) | Major axis (μm) | Oxynitride in grain boundary phase | Thermal conductivity (W/m.K) | Strength (MPa) |
|---|---|---|---|---|---|---|---|
| 1-7 | 200 × $N_2$ | 1800 | 94 | 6 | $Y_4Si_2O_7N_2$ | 82 | 702 |
| 1-8 | 400 × $N_2$ | 1800 | 90 | 6 | $Y_4Si_2O_7N_2$ | 85 | 700 |
| 1-9 | 800 × $N_2$ | 1800 | 88 | 5 | $Y_4Si_2O_7N_2$ | 85 | 690 |
| 1-10 | 500 × vacuum | 1800 | 90 | 7 | $Y_4Si_2O_7N_2$ | 95 | 750 |
| 2-7 | 200 × $N_2$ | 1900 | 95 | 15 | $Yb_4Si_2O_7N_2$ | 85 | 700 |
| 2-8 | 400 × $N_2$ | 1900 | 93 | 12 | $Yb_4Si_2O_7N_2$ | 95 | 695 |
| 2-9 | 800 × $N_2$ | 1900 | 88 | 10 | $Yb_4Si_2O_7N_2$ | 95 | 650 |
| 2-10 | 500 × vacuum | 1800 | 92 | 12 | $Yb_4Si_2O_7N_2$ | 110 | 700 |
| 3-7 | 200 × $N_2$ | 1850 | 94 | 9 | $Sm_2Si_3O_3N_4$ | 85 | 800 |
| 3-8 | 400 × $N_2$ | 1850 | 94 | 8 | $Sm_2Si_3O_3N_4$ | 95 | 790 |
| 3-9 | 800 × $N_2$ | 1850 | 90 | 6 | $Sm_2Si_3O_3N_4$ | 85 | 702 |
| 3-10 | 500 × vacuum | 1800 | 90 | 9 | $Sm_2Si_3O_3N_4$ | 98 | 790 |

TABLE 9

| Sample | Sintering aid (wt. %) | Amount of coating agent (wt. %) | Density (%) | Major axis (μm) | Thermal conductivity (W/m·K) | Strength (MPa) |
|---|---|---|---|---|---|---|
| 1-11 | $Y_2O_3$ | 15 | 85 | 3 | 70 | 600 |
| 2-11 | $Yb_2O_3$ | 15 | 85 | 4 | 70 | 605 |
| 3-11 | $Sm_2O_3$ | 15 | 86 | 4 | 72 | 610 |

As understood from the above results, in all the samples, since the reducing coating agent was added in amounts of greater than 10% by weight based on the weight of the silicon powder, oxygen in $SiO_2$ on the surface of the silicon powder was excessively reduced due to a carbon component in the coating agent, and removed more than required, so that a liquid-phase-generating temperature became higher and the amount of the liquid phase generated also was decreased. Accordingly, sintering did not progress sufficiently, so that the relative density, the thermal conductivity and the three-point bending strength of the resultant sintered bodies lowered slightly than those of Examples 2 to 4.

EXAMPLE 6

Each sintering aid of $Y_2O_3$, $Yb_2O_3$ and $Sm_2O_3$ was added to the same silicon powder as used in Example 1 described above, in the same manner as Example 5. Using the same silane-coupling agent of vinyl triethoxysilane as a reducing coating agent, $Si_3N_4$ sintered bodies were prepared. In this Example 6, the amount of addition of the reducing coating agent was 5% by weight based on the weight of the silicon powder for all the samples and the reducing heat-treatment temperature in an atmosphere containing nitrogen at 1 atm was varied as shown in Table 10 below. Each of $Si_3N_4$ sintered bodies thus obtained was evaluated in the same manner as Example 1 and the results are shown in Table 10.

TABLE 10

| Sample | Sintering aid (wt. %) | Reducing heat-treatment temperature (° C.) | Sintering temperature (° C.) | Density (%) | Major axis (μm) | Thermal conductivity (W/m.K) | Strength (MPa) |
|---|---|---|---|---|---|---|---|
| 1-12 | $Y_2O_3$ | 190 | 1850 | 86 | 2 | 72 | 600 |
| 1-13 | $Y_2O_3$ | 900 | 1950 | 87 | 3 | 73 | 610 |
| 2-12 | $Yb_2O_3$ | 190 | 1850 | 86 | 3 | 73 | 620 |
| 2-13 | $Yb_2O_3$ | 900 | 2000 | 86 | 4 | 75 | 620 |
| 3-12 | $Sm_2O_3$ | 190 | 1800 | 87 | 3 | 75 | 630 |
| 3-13 | $Sm_2O_3$ | 900 | 1950 | 85 | 3 | 75 | 600 |

When the reducing heat-treatment temperature was lower than 200° C., the reducing reaction of oxygen in $SiO_2$ on the surface of the silicon powder did not progress sufficiently, and the reducing coating agent remained on the surface of silicon particles, whereby the subsequent nitriding reaction was liable to be interfered. In contrast to this, when the reducing heat-treatment temperature exceeded 800° C., almost all the oxygen in the silicon particle surfaces were removed, whereby the sinterability lowered. As a result, as understood from Table 10 described above, the thermal conductivity and the three-point bending strength of all the $Si_3N_4$ sintered bodies obtained lowered slightly as compared with Examples 2 to 4.

EXAMPLE 7

The relative density, thermal conductivity and three-point bending strength of two types of sintered bodies obtained respectively by different methods were examined. One method was reactive sintering of silicon and the other was sintering of silicon nitride. The sintered body produced by sintering silicon nitride represents a conventional sintered body. In both methods, 7.5 wt % of $Yb_2O_3$ was added to the starting materials before sintering at 1750° C. The resulting relative density, thermal conductivity and three-point bending strength attributable to the difference in starting materials is shown in the Table 11.

As clearly shown in Table 11, the reactive sintering of Si powder can produce a highly dense and sufficiently strong sintered body even when oxygen content is low. In the range of 0.1–0.8 in the molar ratio $SiO_2/Yb_2O_3$, a sintered body having sufficient density and strength is not obtainable if silicon nitride is used as a starting material.

It was unexpectedly found necessary and important to restrict the molar ratio of the oxygen in terms of $SiO_2$ to the oxide $Ln_2O_3$ in the $Si_3N_4$ crystal grains to obtain $Si_3N_4$ sintered bodies having high thermal conductivity and mechanical strength. By strategically controlling the amount of oxygen within the molar ratio range of about 0.1 to about 0.8, $Si_3N_4$ sintered bodies were successfully made in an efficient manner at a temperature of 1750° C. and under 1 atm, which sintering temperature and pressure are lower than those of employed in conventional practices.

EXAMPLE 8

The dependency of the relative density and the three-point bending strength on sintering temperature was examined and the results set forth in Table 12. The sintered bodies were produced by substantially the same two methods as in Example 7, except for the sintering temperature. It is clear that the sintered body of the present invention has a high strength even when sintered at a low temperature, such as 1750° C.

TABLE 11

| Molar ratio of $SiO_2/Yb_2O_3$ | Oxygen content/ wt % | Using Si powder | | | Using $Si_3N_4$ powder | | |
|---|---|---|---|---|---|---|---|
| | | Relative density of sintered body/% | Thermal conductivity/ W/m.K | Three-point bending strength/ MPa | Relative density of sintered body/% | Thermal conductivity/ W/m.K | Three-point bending strength/ MPa |
| 0.174 | 0.2 | 89 | 50 | 65 | 50 | 37 | 28 |
| 0.435 | 0.5 | 94 | 90 | 85 | 51 | 42 | 32 |
| 0.435 | 0.7 | 96 | 110 | 94 | 55 | 48 | 42 |
| 0.783 | 0.9 | 97 | 95 | 97 | 60 | 40 | 55 |
| 1.306 | 1.5 | 99 | 69 | 99 | 70 | 48 | 68 |
| 1.741 | 2 | 99 | 60 | 105 | 90 | 55 | 88 |
| 2.176 | 2.5 | 99 | 59 | 101 | 99 | 59 | 102 |
| 2.612 | 3 | 99 | 55 | 90 | 99 | 58 | 92 |

TABLE 12

| Molar ratio of $SiO_2/Yb_2O_3$ | Oxygen content/ wt % | Sintering temperature/ °C | Using Si powder | | Using $Si_3N_4$ powder | |
|---|---|---|---|---|---|---|
| | | | Relative density of sintered body/ % | Three-point bending strength/ MPa | Relative density of sintered body/ % | Three-point bending strength/ MPa |
| 0.435 | 0.7 | 1750 | 96 | 110 | 55 | 42 |
| 0.435 | 0.7 | 1800 | 99 | 115 | 78 | 55 |
| 0.435 | 0.7 | 1900 | 99 | 95 | 84 | 67 |
| 0.435 | 0.7 | 2000 | 99 | 78 | 99 | 78 |

According to the invention, by the reactive sintering method using the silicon powder as a raw material, while maintaining the high strength property inherent to $Si_3N_4$ sintered bodies, $Si_3N_4$ sintered bodies having an extremely high thermal conductivity can be produced at a low cost under the producing conditions applicable in mass production. Therefore, the $Si_3N_4$ sintered body according to the invention is preferable as structural parts and mechanical parts in which a high degree of thermal shock resistance is required.

What is claimed is:

1. A $Si_3N_4$ sintered body produced by reactive sintering of silicon, said $Si_3N_4$ sintered body comprising crystal grains of $Si_3N_4$ and a grain boundary phase, wherein:

an oxide ($Ln_2O_3$) of at least one element (Ln) selected from the group consisting of Y, Yb and Sm is contained in an amount of 0.6 to 13% by weight;

an oxygen content in the crystal grains of $Si_3N_4$ is not more than 1% by weight;

a molar ratio of $SiO_2/Ln_2O_3$ in the $Si_3N_4$ sintered body is within a range of 0.1 to 0.8; and the $Si_3N_4$ sintered body has a relative density in the range of 85 to 99.99%, a thermal conductivity of at least 70W/m.K or more, and a three point bending strength of at least 600 MPa.

2. The $Si_3N_4$ sintered body according to claim 1, wherein said crystal grains of $Si_3N_4$ are a β-$Si_3N_4$ crystal having an average grain size of 2 μm or more in major axis, and a compound of $Ln_aSi_bO_cN_d$ (wherein 2<a<4, 2<b<3, 0<c<7, 2<d<4) is contained in the grain boundary phase.

3. The $Si_3N_4$ sintered body according to claim 1, wherein said $Ln_2O_3$ and said Ln are $Yb_2O_3$ and YB, respectively.

4. The $Si_3N_4$ sintered body according to claim 3, wherein a compound $Yb_4Si_2O_7N_2$ is contained in the grain boundary phase.

5. The $Si_3N_4$ sintered body according to claim 1, wherein silicon powder is used as starting material of the $Si_3N_4$ sintered body.

6. A $Si_3N_4$ sintered body according to claim 1, wherein the $Si_3N_4$ sintered body is sintered at a temperature within 1700–1800° C.

* * * * *